United States Patent [19]

Foster

[11] 3,965,768

[45] June 29, 1976

[54] SLIPPING BELT CLUTCH

[75] Inventor: James R. Foster, Webster City, Iowa

[73] Assignee: Franklin Manufacturing Company, St. Cloud, Minn.

[22] Filed: July 25, 1975

[21] Appl. No.: 599,178

[52] U.S. Cl. .................. 74/242.11 R; 74/242.15 R
[51] Int. Cl.² ..................... F16H 7/12; F16H 7/10
[58] Field of Search ............. 74/242.11 R, 242.15 R

[56] References Cited
UNITED STATES PATENTS

| | | | |
|---|---|---|---|
| 3,330,049 | 7/1967 | Helton | 74/242.11 R X |
| 3,623,378 | 11/1971 | Stanford | 74/242.11 R X |

Primary Examiner—Leonard H. Gerin
Attorney, Agent, or Firm—McNenny, Pearne, Gordon, Gail, Dickinson & Schiller

[57] ABSTRACT

A belt drive system in a washing machine for bidirectional operation in selection of agitation and spin cycles and having a belt and pulley arrangement adapted to transmit full motor torque in the agitation direction and substantially limited torque through belt slippage in the spin direction whereby final spin speed is reduced in proportion to out-of-balance conditions existing in the spin tub. A motor drive pulley having heat barrier means is provided to isolate friction heat generated by belt slippage on the pulley rim from the motor shaft and to prevent damage to elements in engagement with the shaft. A method of calibrating a belt tensioning spring is also disclosed.

13 Claims, 7 Drawing Figures

SLIPPING BELT CLUTCH

BACKGROUND OF THE INVENTION

The invention relates to mechanical power transmission and, more particularly, pertains to improvements in belt drive systems.

PRIOR ART

Numerous belt drive applications require that the torque transmitted to a driven member be limited to less than the torque capacity of a driving member. In the specific application of domestic washing machines, it has been the custom in many product designs to limit the torque which is applied in at least the initial period of a spin cycle to allow the motor to reach full speed as soon as possible, while permitting the spin tub to accelerate somewhat more slowly to its final speed. Typically, the starting-winding of the appliance motor would overheat if it remained energized during the time required to accelerate the spin tub to its final speed, owing to its rotational inertia and the damping forces developed by water in and surrounding the spin tub. Besides motor protection, slow acceleration of the spin tub through drive slippage allows the clothes or other articles to distribute themselves evenly within the spin tub. Additionally, slow spin tub acceleration avoids polka dot spotting of the articles, which may occur where soiled water is not removed from the spin tub before articles are tightly held against the perforations of the tub by centrifugal force and water being centrifuged is forced through the articles at the spin tub perforations. The differential rates of start-up between the motor and spin tub have generally been accommodated by either a slip clutch such as that disclosed in U.S. Pat. No. 3,783,652 to Archbold, or slipping belts such as disclosed, for example, in U.S. Pat. Nos. 2,653,483 to Smith; 3,029,624 to Fogt; 3,057,218 to Knerr; 3,525,241 to Morton; and Swiss patent 284,878, published December 1, 1952.

Prior machines, for instance those embodying the slipping disc drive disclosed in the aforementioned U.S. Pat. No. 3,783,652 to Archbold, have been arranged to limit the final spin speed in proportion to the magnitude of the out-of-balance condition of articles distributed within the spin tub. Without such speed protection, there is a risk that unbalanced loads will result in excessive vibration, noise, movement of the machine on the floor, and striking of the cabinet by the gyrating inner tub. Generally, the torque level necessary for final speed limitation in out-of-balance situations is substantially less than that which produces acceptably slow acceleration of the spin tub so that final speed limitation is not usually achieved by simple resort to limitation of torque satisfactory for slow acceleration.

Many current domestic washing machine designs depend upon selection of agitation and spin operational modes by selection of the direction of rotation of a reversible drive motor. Generally, it is desirable that full motor torque be available throughout the agitation cycle for full washing effectiveness, since this cycle is the highest power consuming mode and, generally, rotational inertia is readily overcome by the starting-winding of the drive motor upon initiation of this mode. In the past, limitation of the delivered torque during rotation in the spin direction and positive drive in the agitation direction have been achieved, as for example in the aforementioned U.S. Pat. No. 3,783,652, by using, in addition to a slip clutch, a one-way spring clutch on the transmission input shaft to lock the transmission pulley to the input shaft in the agitation direction. A problem associated with slipping disc arrangements is an inherent sensitivity which makes initial adjustment difficult, and which leads to wide variation in performance with normal wear or contamination by oil or other foreign material.

SUMMARY OF THE INVENTION

The invention provides a bidirectional drive belt arrangement which affords accurate torque limitation in one rotary direction by belt slippage and full torque transmission in the opposite direction. The belt drive arrangement develops a torque differential between its bidirectional modes, and is therefore particularly suited to application in a domestic washing machine wherein the low level torque mode may be utilized to reliably reduce the final speed of the spin tub when out-of-balance conditions exist and where the high level torque mode is of sufficient magnitude to provide adequate power for agitation. The ratio of slip torque to full torque requisite for proper performance is achieved in accordance with the invention by a critical belt and pulley geometry in which a belt tensioner develops a relatively high belt tension for a given idler load. As disclosed, this result is achieved by maintaining an angle of belt wrap over an idler pulley within a critical range to ensure a minimum belt tension, while avoiding excess sensitivity and difficulties in maintaining consistent control.

The idler pulley is supported on a pivotal lever which in turn is spring-biased to maintain a desired belt tension. There is provided, in accordance with an important feature of the invention, a simplified method of quickly calibrating the spring and lever to the particular requirements and tolerances of each washing machine as it is assembled.

Another important feature of the invention is the provision of a belt pulley which effectively reduces heat transfer between its rim and hub and which is advantageously employed to isolate frictional heat generated in the slipping belt drive of a washing machine from conduction to the drive motor shaft. The heat barrier action of the pulley thereby protects an adjacent motor shaft bearing and a shaft-mounted pump impeller from heat damage. As disclosed in accordance with the invention, the pulley includes a web structure intermediate the rim and hub portions which forms a heat conduction path having a length substantially longer than the space between the rim and hub. The elongated heat conduction path provides a natural resistance to heat transfer proportional to its length which is adequate to prevent heat damage to elements associated with the shaft.

DESCRIPTION OF THE PREFERRED EMBODIMENT

Figure 1:
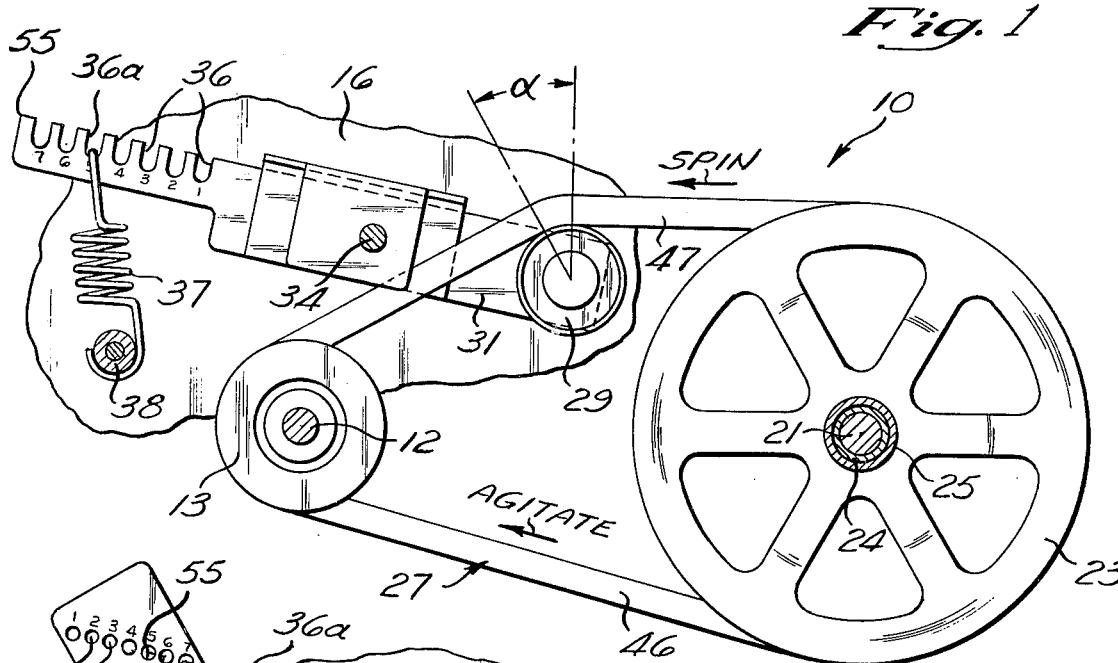
FIG. 1 is a plan view of a slipping belt and pulley drive system in a washing machine.
Figure 2:
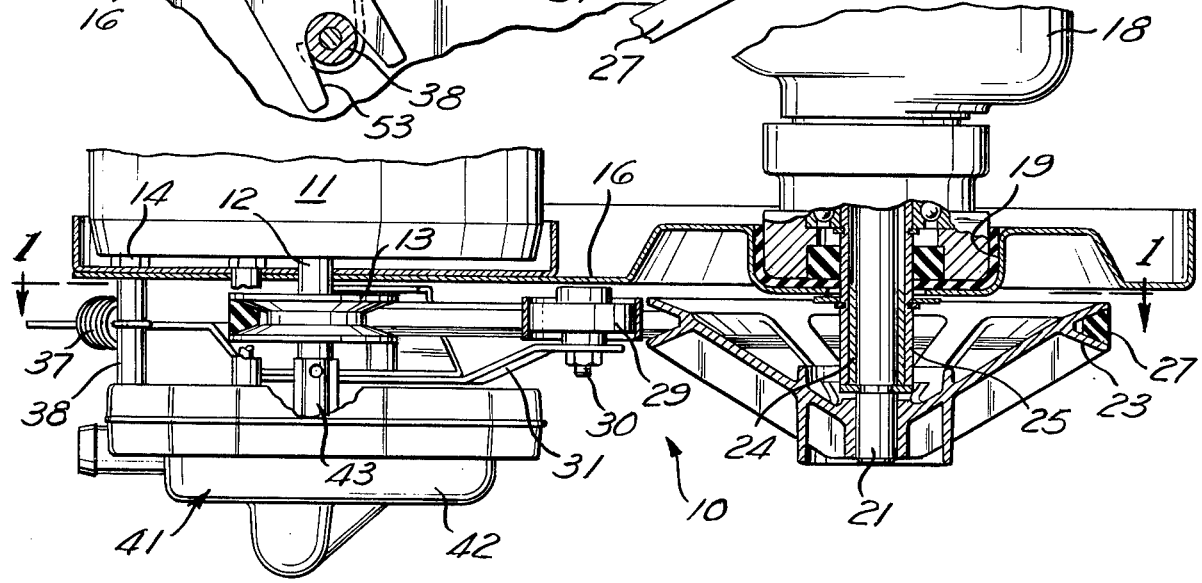
FIG. 2 is an elevational view of the belt and pulley drive of FIG. 1, including further details of associated components.

Referring particularly to FIGS. 1 and 2, there is shown a power drive system 10 for a clothes washing machine which, with the exception of the belt and pulley drive system to be described, is generally conventional in construction. A suitable machine in which the present invention may be employed is shown in the aforementioned U.S. Pat. No. 3,783,652 to Archbold, the disclosure of which is incorporated herein by reference. This patent describes the physical association and working relationship of an imperforate, nonrotating, water-holding inner tub, a perforate spin tub or drum, an agitator, and a suitable transmission for selectively driving either the spin tub or agitator, depending upon the direction of rotation of the input shaft of the transmission. In the present disclosure, the direction of rotation of the various elements of the power drive system is indicated by the legends "AGITATE" and "SPIN" in FIG. 1.

A reversible electric motor 11 has a vertical output shaft 12 on which a drive pulley 13 is keyed by a setscrew or other suitable means. The motor 11 is supported by studs 14 on a generally horizontally disposed mounting plate within a cabinet (not shown) of the washing machine. The motor 11 is laterally spaced from a transmission 18, the lower end of which is resiliently supported in a cavity 19 integrally formed in the moutning plate 16.

The transmission 18 includes a vertically depending input shaft 21 which, it will be understood, is adapted to oscillate a vertical agitator when driven in a clockwise direction as viewed in FIG. 1 and to spin a perforate tub surrounding the agitator when driven in a counterclockwise or opposite direction.

A driven pulley 23 is keyed by suitable means, such as a setscrew, to the lower end of the input shaft 21. The shaft 21 is rotatably supported in a bearing 24 on a tubular extension 25 of the transmission 18. The pulley 23 is somewhat larger than the motor drive pulley 13 to effect a speed reduction at the input shaft 21 from motor speed. A V-belt 27, ideally of the type known in the trade to which the invention pertains as a "dry belt" for intentional slipping operation, is assembled around the pulleys 13 and 23, and is constantly tensioned at one side or reach by an idler pulley 29. The idler pulley 29 is rotatably mounted on a shoulder bolt 30 at an outer end of a pivotal lever 31. The pivotal lever 31 swings in a horizontal plane on a vertical pin 34. At an end opposite the idler pulley 29, the lever 31 is provided with a series of regularly spaced adjustment notches 36. A tension spring 37 is hooked between one of the notches 36a and a rigid post 38 depending from the mounting plate 16. As illustrated, the various elements are arranged such that the idler pulley 29 is supported for movement generally perpendicular to the adjacent belt reach and the force of the spring 37 operates on a line generally perpendicular to the longitudinal direction of the lever during normal operation.

A pump 41 such as that disclosed in my U.S. Pat. No. 3,851,993, for discharging water from the inner tub while the perforate tub therein is in the spin mode, is mounted below the motor 11. The pump 41 includes a housing 42 supported on a plurality of posts 38. Within the housing 42 is an impeller having an integral hub 43 which may be formed of a suitable thermoplastic material. The impeller hub 43, as shown, is fixed directly to the motor shaft 12.

Ideally, the belt and pulley system is arranged to transmit sufficient torque to the transmission input pulley 23 without belt slippage on either pulley 13 or 23 for adequate power during agitation operation and a lower level of torque, limited by belt slippage on the motor pulley, in the manner of a clutch, during spin operation. The lower torque level in spin provides slow acceleration of the spin tub during the initial part of each spin cycle, and, as explained hereinbelow, in cases where an eccentric or out-of-balance condition persists during a spin cycle, the lower torque limits the final spin speed to avoid excessive vibration, noise bearing loads, and other harmful effects.

In the agitation direction, the belt 27 operates in a conventional manner in transmitting torque from the motor pulley 13 to the transmission pulley 23 by tension in the reach designated 46 opposite an idler pulley 29. During agitation, because of high frictional engagement between the belt 27 and the pulleys 13 and 23, tension in the reach 46 is substantially higher than that in the reach, designated 47, associated with the idler pulley 29, and is only slightly affected by tension in this idler reach. With the belt 27 and pulleys 13 and 23 properly sized, under such circumstances, and with a relatively low tension in the idler reach 47, the belt is capable of transmitting substantially all of the motor torque to the transmission in agitation.

On the other hand, tension in the idler reach 47 is directly limited by the force applied by the idler spring 37, since the idler 29 is forced to withdraw inwardly toward the pulleys 13 and 23 when the force components of the belt tension exceed the biasing force of the spring at the idler. Such withdrawal of the idler 29 immediately allows the belt to slip on the drive pulley 13 to thereby limit torque transmission to the driven pulley 23.

It has been found that a substantial difference or ratio of torque transmission between spin and agitation must be provided to achieve satisfactory speed limitation during out-of-balance conditions in the spin tub. The measure of this torque ratio is given empirically by the difference in motor wattage required for agitation and spin, which may range, by way of example, between 700 and 750 watts for agitation, depending on the particular machine in question, and corresponding wattages for spin in the order of 600 to 650 watts. This ratio of agitation-to-spin power, which is approximately in the order of between 7:6, in accordance with the invention, is achieved by arranging the geometry of the belt and pulleys such that the angle of wrap on the idler pulley 29 falls in a critical range approximately between 20° and 40°, as indicated in the shaded area of FIG. 3.

It has been determined that an angle of belt wrap about the idler pulley 29 in this range yields the most easily adjusted configuration and the most consistent performance. At angles substantially greater than this range, it is difficult to obtain a substantial ratio of spin-to-agitate torque because for a given slip torque in spin, there appears to be a fall-off of agitation torque capacity wherein the belt tends also to slip in the agitation mode. At angles substantially less than this range, it is difficult to initially adjust the idler spring tension to give satisfactory results.

Figure 6:
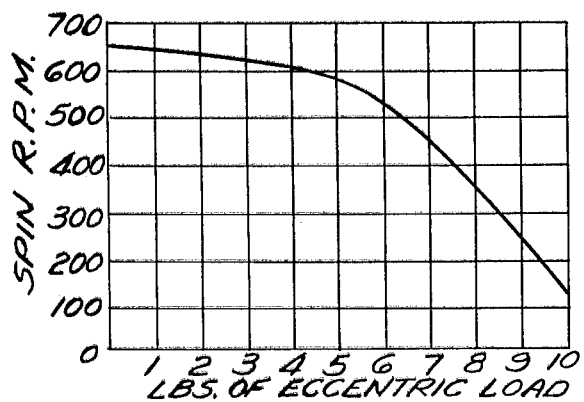
FIG. 6 is a graph illustrating a typical relationship of final spin speed to eccentric load in a spin tub.

FIG. 6 illustrates the relationship of final spin tube speed after initial acceleration and eccentric load as produced by the belt and pulley arrangement of FIG. 1. Inspection of the curve of FIG. 6 reveals that a maximum spin speed is achieved with little or no eccentric load, i.e., when articles of clothing or the like in the spin tub are distributed evenly about the periphery of the tub. The final spin speed falls off gradually with increasing eccentric load, as where the articles in the spin tub are gathered at one side of the tub, to a final speed of 140 rpm with 10 pounds of eccentric load idealized at a single point on the periphery of the spin tub. The reduction in final speed is the result of the dissipation of energy, equal to the limited power transferred by the slipping belt during the spin mode, in damping action of the suspension on which the inner tub, the spin tub, transmission, and various other elements are supported. A suitable suspension is illustrated in the aforementioned Archbold U.S. Pat. No. 3,783,652 and U.S. Pat. No. 3,493,118 to Brucken.

The setting of the tension spring 37 in a particular notch 36a of the lever 31 depends on the final combination of tolerances between the various elements of the washing machine. These tolerances include variation in the actual belt length from a nominal dimension and positional variations of the centers of the motor and transmission pulleys 13 and 23. In accordance with an important aspect of the invention, there is provided a method of calibrating the tension spring 37 and notched lever 31 to a particular machine and its set of manufacturing tolerances. The method, illustrated in FIG. 1a, comprises the use of a tool or gauge 51 which provides a series of indicating holes 52 spaced in equal increments along a straight line at an angle of about 45° from the longitudinal direction of the gauge. The holes 52 of the gauge 51 are calibrated to indicate an appropriate notch 36a on the idler lever 31 for a particular machine and its specific dimensional characteristics. The gauge indicating holes 52, equal in number to the number of notches 36, are arranged to cooperate with a reference point 55 on the lever 31, in the illustrated embodiment, taken as the upper left corner of the lever. With the idler lever 31 provisionally tensioned by the spring 37 in the central notch (notch number 4 in FIG. 1a) and a yoke or base point 53 of the lever embracing the spring anchor post 38, the gauge 31 is pivoted about the post until a hole 52 which most closely registers with the reference point 55 is found. This closely registering hole 52 indicates in a reverse order the proper notch 36a in which the spring should be hooked.

Figure 1A:
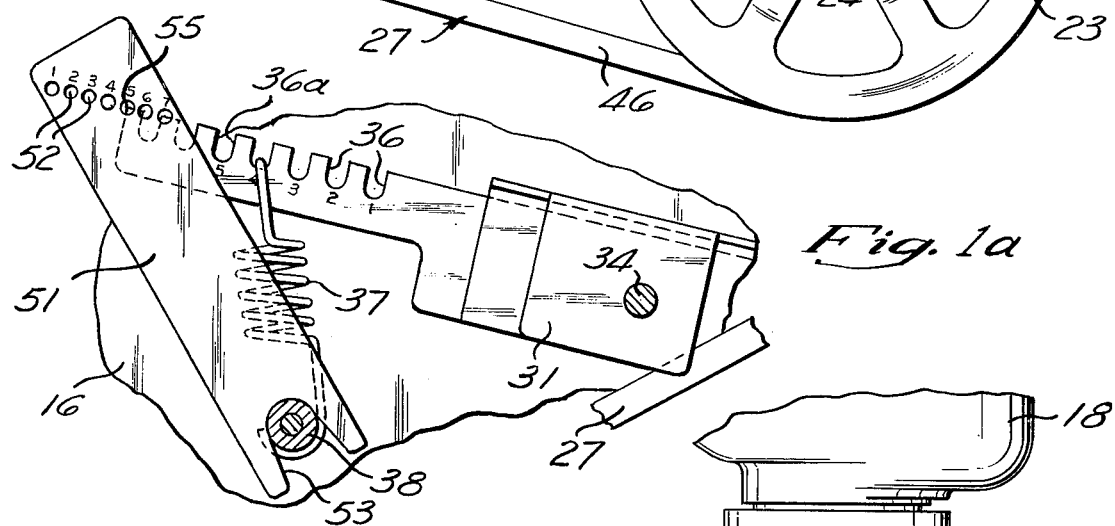
FIG. 1a is a somewhat simplified view of a portion of the area of FIG. 1, illustrating use of a device for calibrating a tension spring which controls belt tension.

In the illustration of FIG. 1a, the number 5 hole, counting from the left, is in close registration with the reference point 55 and therefore the spring 37 is hooked in the fifth notch counting from the right (FIG. 1). The spacing of the holes 52 from the yoke or base point 53 is derived empirically for belts varying from a nominal dimension and other machine dimensional variations to yield for all of the notch settings, a single slip torque in the spin mode.

Figure 3:
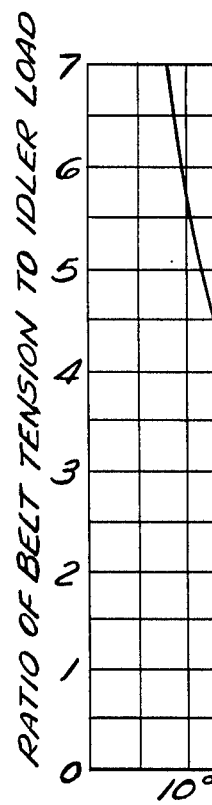
FIG. 3 is a graph depicting the relationship between idler load versus belt tension for different angles of belt wrap over an idler and delineating a critical range of belt wrap for reliable torque limiting action in one direction and nonslip action in the opposite direction.

As will be understood with reference to FIGS. 1 and 3, where the belt length is relatively long from a nominal dimension, the belt angle of wrap will be relatively high and therefore will require a high idler load for a given tension or torque. In this situation, the notched idler lever 31 swings close to the fixed post 38 and a high numbered hole will be indicated so that the spring 37 is hooked at a notch remote from both the lever pivot 34 and the anchor point 38 and a high idler force will be developed by the spring. Conversely, where the belt is relatively short, the wrap angle will be relatively low, a low hole number will be indicated, and a relatively light force will be applied by the spring in a low numbered notch. When properly adjusted, the idler pulley 29 vibrates during belt slipping action to permit the belt to rapidly slip and grab on the drive pulley 13. The idler pulley 29 and spring 37, moreover, are self-adjusting for normal belt wear during the life of the machine.

Figure 4:
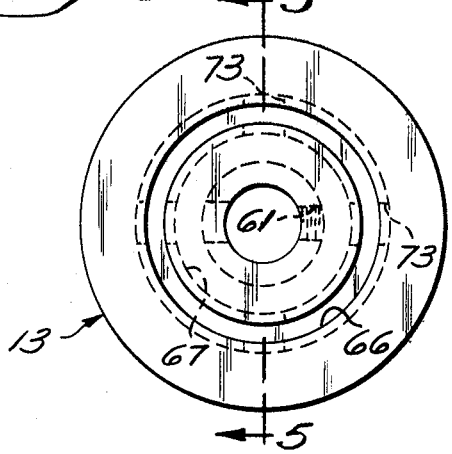
FIG. 4 is a face view of a pulley constructed in accordance with the invention.
Figure 5:
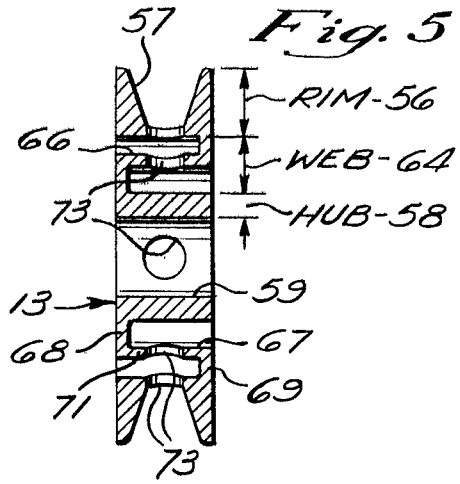
FIG. 5 is a cross sectional view of the pulley taken along the line 5—5 in FIG. 4.

Referring to FIGS. 4 and 5, there are illustrated details of a pulley which is particularly suited for use as the motor drive pulley 13 to isolate the motor shaft 12 from heat generated by the belt 27 during extended slipping action in the spinning of an unbalanced load. The pulley 13 is conveniently fabricated by turning it from free machining, round steel bar stock having a diameter approximately equal to or slightly greater than the finished outside diameter of the pulley. The pulley 13 includes an outer peripheral rim portion 56 in which are formed surfaces of a conventional V-groove 57. An inner hub portion 58 of the pulley 13 includes a bore 59 for reception therein of the motor shaft 12. A threaded radial bore 61 in the hub 58 is adapted to receive a setscrew for locking the pulley 13 on the shaft 12. As shown, the surfaces of the rim, hub, and intermediate web portions at each face of the pulley are coplanar.

The pulley 13 is partially trepanned or grooved at opposite faces, with the groove 61 of one face being spaced radially outside of the groove 67 formed at the opposite face. The grooves 66 and 67 are concentric with the bore 59 and each extend substantially through the length or axial thickness of the pulley 13, terminating at relatively thin radial end wall sections 68 and 69 at opposite faces of the pulley. The grooves 66 and 67 are of substantial radial thickness in comparison to the total radial extent of the web portion 64, so that a remaining cylindrical land section 71 of the web is also relatively thin. Stated in other words, the web portion 64 is that material remaining after the provision of the axially extending, radially spaced grooves 66 and 67. The cylindrical land section 71 is supported at its respective ends by the radial wall sections 68 and 69. By way of comparison, the radial and axial wall sections 68, 69, and 71 of the web 64 are substantially thinner than the hub and rim portions.

It may be appreciated that the minimum heat flow path between the rim 56 and hub 58, defined in series by the radial wall section 68, the axial extending section or cylindrical land 71, and the radial wall section 69, is substantially longer than the radial distance between the hub and web. In the illustrated configuration, the increased length of the heat conduction path over the radial distance between the rim 56 and the hub 58 is that corresponding to the length of the cylindrical web section 71. Heat conduction between the rim and hub is additionally lessened by the reduced cross sectional area of the heat path afforded by the relatively thin walls of these sections. In addition to the restriction of heat transfer between the rim and hub by the relatively long heat path of limited cross sectional area, the grooves 66 and 67 provide air circulation for convection heat transfer away from the pulley surfaces, as well as radiation heat transfer. A plurality of angularly spaced radial holes 73 may be provided through the rim and web sections 56 and 58 to increase air flow through the pulley grooves 66 and 67.

The pulley 13 thereby protects the motor shaft 12 from excess heat, which, in certain instances, might cause harm to the associated motor shaft bearing (not shown) and the pump impeller hub 43. In actual tests, it has been found that the pulley structure is capable at room temperatures of maintaining the hub 58 at a temperature of no more than 250° F. while the rim is heated to a temperature of 700° F.

It is contemplated that the pulley 13 may be formed by other processes, such as casting or molding, or other suitable fabricating techniques, and that it may be advantageously employed in various other belt drive systems in which it is either a driving or driven pulley and in which it is desired, for example, to isolate heat emanating from the shaft on which it is mounted to the rim to protect a belt mounted thereon. Further, where necessary or desired, more than two axial grooves may be provided in the faces of the pulley.

FIGS. 1 and 2 are drawn substantially to scale, and, by way of example, the motor drive pulley has a nominal outside diameter of 2-7/16 inch, while the transmission pulley 23 has an outside diameter of 6-13/16 inch, with each pulley having a V-groove of 38 degrees and being spaced on a center-to-center distance relative to each other of 8-7/32 inch.

While the invention has been described in connection with specific embodiments thereof, it is to be clearly understood that this is done only by way of example, and not as a limitation to the scope of the invention as set forth in the objects thereof and in the appended claims.

What is claimed is:

1. In a belt drive system for a washing machine, a reversible drive motor having an output shaft and a drive pulley fixed thereon, a transmission having an input shaft and a driven pulley fixed thereon, said transmission being adapted to effect agitation of articles in a spin tub of the machine when said transmission pulley is driven in a first rotary direction and to effect spinning of the spin tub when said transmission pulley is driven in the opposite rotary direction, a drive belt connecting said pulleys, and means resiliently tensioning one reach of said belt driving said transsmission pulley in the spin direction to limit the level of torque transmitted to said transmission pulley during spin operation by permitting belt slippage when the torque limit is reached, said resilient tensioning means including means for limiting spin torque to a level sufficiently low to result in a reduction of final spin speed when an out-of-balance condition exists in the spin tub, said resilient tensioning means being substantially ineffective to limit tension in an opposite belt reach driving said transmission pulley in the agitation direction whereby full motor power is transmitted to said transmission for agitation operation.

2. A belt drive system as set forth in claim 1, wherein said resilient tensioning means includes means to limit spin torque relative to agitation torque at a level at which motor wattage in spin is approximately at a ratio of 6 to 7 or less of motor wattage in agitation.

3. A belt drive system as set forth in claim 2, wherein said tensioning means includes an idler pulley in engagement with said one belt reach.

4. A belt drive system as set forth in claim 3, wherein said tensioning means includes a spring biasing said idler into engagement with said one belt reach.

5. A belt drive system as set forth in claim 4, wherein said belt reach is arranged to wrap about said idler through an angle in the range of substantially between 20° and 40°.

6. A belt drive system as set forth in claim 5, wherein said idler pulley is mounted on a pivotal lever, the pivot axis of said lever being arranged relative to said idler pulley and said belt to permit said idler pulley to swing in engagement along a path generally transverse to said one belt reach.

7. A belt drive system as set forth in claim 6, wherein said spring is arranged to produce a force on said lever along a line substantially at right angles to the line between said pivot axis and said idler pulley.

8. A belt drive system as set forth in claim 7, wherein said pivot lever includes means for adjustably positioning the line of force of said spring along said line between said pivot axis and said idler pulley.

9. A belt drive system in a washing machine comprising a reversible drive motor having an output shaft and a drive pulley fixed thereon, a transmission having an input shaft and a driven pulley fixed thereon, said transmission being adapted to effect agitation of articles in a spin tub of the machine when said transmission pulley is driven in a first rotary direction and to effect spinning of the spin tub when said transmission pulley is driven in the opposite rotary direction, a drive belt connecting said pulleys, a belt tensioning idler pulley in resilient engagement with a reach of said belt active in driving said transmission in spin operation, said belt and said idler pulley being arranged such that said belt is wrapped about said idler through an angle substantially in the range of between 20° and 40°, whereby a relatively large belt tension is developed for a given idler load and a relatively high ratio of torque transmission by said belt between agitation operation and spin operation is developed.

10. In a washing machine, a belt drive system comprising a reversible drive motor having an output shaft and a drive pulley fixed thereon, a transmission having an input shaft and a pulley fixed thereon, said transmission being adapted to effect agitation of articles in the spin tub of the machine when said transmission pulley is driven in a first rotary direction and to effect spinning of the spin tub when said pulley is driven in the opposite rotary direction, a drive belt connecting said pulleys, and means resiliently tensioning one reach of said belt driving said trasmission pulley in the spin direction to limit the level or torque transmitted to said transmission pulley during spin operation by permitting belt slippage, said motor drive pulley having an outer peripheral rim portion frictionally engaged by said belt and an inner hub portion in engagement with said output shaft, said motor drive pulley having heat barrier means to prevent excessive transfer of heat from said rim developed by slipping of said belt in said spin operation to said motor shaft to protect said motor from heat damage.

11. A washing machine as set forth in claim 10, wherein said heat barrier means includes a heat conducting path between said pulley rim and said pulley hub substantially longer than the distance between said rim and said hub.

12. A washing machine as set forth in claim 11, including a pump impeller mounted directly on said motor output shaft.

13. A method of calibrating a spring-loaded idler in a slipping belt clutch, which comprises the steps of assembling a belt over a driving pulley and a driven pulley, provisionally tensioning the belt by moving a lever-mounted idler into engagement with a reach of the belt between said driving and driven pulleys, providing a gauge having indicating means incrementally spaced at varying distances from a base point on the gauge, the varying distances of said indicating means representing suitable locations for attachment of a tensioning spring along the idler lever, positioning the base point of the gauge at a fixed mounting point for one end of the tensioning spring, swinging the gauge about said fixed mounting point to a portion where said indicating means registers with a reference point on the idler lever and a location for attachment is thereby determined, removing the gauge and installing the spring between said fixed mounting point and said determined attachment location.

* * * * *